A. CARTHEUSER.
PNEUMATIC TIRE CASING.
APPLICATION FILED AUG. 30, 1917.

1,266,403.

Patented May 14, 1918.

WITNESSES

INVENTOR
A. Cartheuser
BY
ATTORNEYS

UNITED STATES PATENT OFFICE.

ARTHUR CARTHEUSER, OF WEST ORANGE, NEW JERSEY.

PNEUMATIC-TIRE CASING.

1,266,403.    Specification of Letters Patent.    Patented May 14, 1918.

Application filed August 30, 1917.    Serial No. 188,972.

*To all whom it may concern:*

Be it known that I, ARTHUR CARTHEUSER, a citizen of the United States, and a resident of West Orange, in the county of Essex and State of New Jersey, have invented a new and Improved Pneumatic-Tire Casing, of which the following is a full, clear, and exact description.

Among the objects which the present invention has in view are: to protect a pneumatic tire from being punctured; to provide a frictional tread for a pneumatic tire, protected from puncture and supported in service by the pneumatic tire; to provide a wearing surface having a number of independently movable members, each directly supported by a pneumatic tire with which said members are associated; and to provide a solid metallic casing for said pneumatic tire for preventing undue expansion thereof by internal strains.

*Drawings.*

*Description.*

Figure 1:
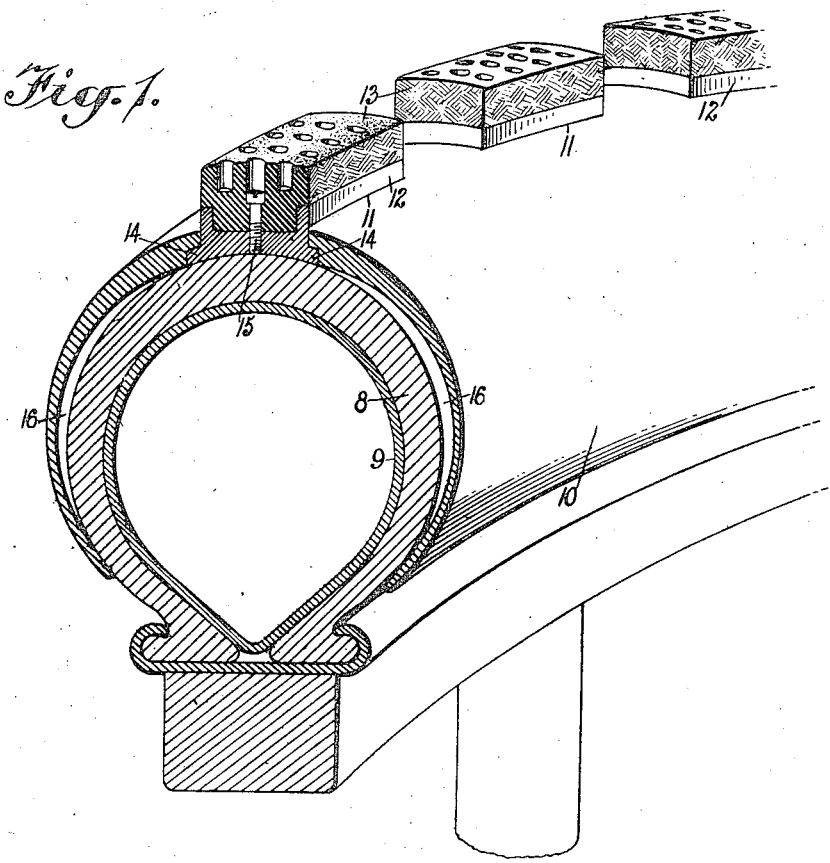
Figure 1 is a perspective view of a fragment of an automobile wheel rim, a pneumatic tire mounted thereon, and a casing associated with said tire, said casing being constructed and arranged in accordance with the present invention.
Figure 2:
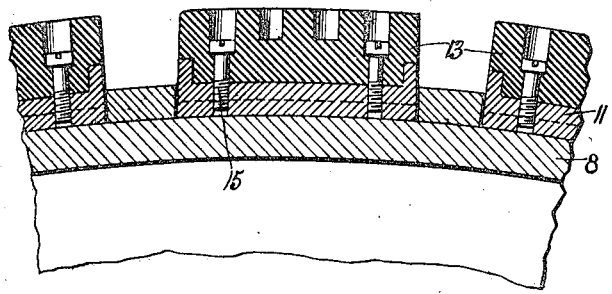
Fig. 2 is a longitudinal section of said casing, showing a series of friction shoes slidably mounted therein.
Figure 3:
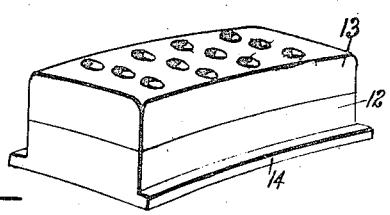
Fig. 3 is a perspective view of one of the friction shoes.

As seen in the drawings, the pneumatic tire has a shoe 8 expanded in service by air held within the inner tube 9. Before inflating the tire, it is placed in a continuous solid metal annular casing 10. The casing 10 is constructed preferably as a single piece of light metal, such as aluminum, and is provided at suitable intervals with elongated openings 11, wherein are slidably disposed tread plates 12. The plates 12 are socketed to form cups for holding rubber shoes 13, which in the completed tire constitute the frictional tread portion thereof. The plates 12 have lateral flanges 14, the under surfaces whereof are shaped to conform with the outer form of the shoe 8. The shoes 13 are held in service on the plates 12 by fastening devices, such as screws 15. When placing the shoe 8 in the casing 10, the plates 12 are secured in the openings provided for them in the casing 10, by any suitable means. They may be tied or otherwise held until the shoe 8 is forced into the said casing. Thereafter the shoe operates to prevent the displacement of the plates 12.

The casing 10 is shaped with reference to the shoe 8 and with reference to the active and inactive sectional shape of the same. That is to say, the sides of the casing are curved to provide spaces 16 between the sides of the shoe and the inner surface of the casing when the said shoe is inactively disposed or when the load of the vehicle is not impressed upon said shoe through the intermediary of the shoes 13. When the section of the tire shown in Fig. 1 passes to the under side of the wheel and supports the load of the vehicle, each shoe 13 and the plate upon which it is mounted, are relatively forced into the casing 10, compressing the associated portion of the shoe 8 and tube 9. The displacement of the air held in the pneumatic tire causes the lateral distension of the pneumatic tire until the lateral sides thereof engage the interior surface of the casing 16. By this arrangement, the desired resiliency of the tire is attained.

It is obvious that the casing 10 being constructed of metal will prevent the usual puncturing of the shoe 8 and tube 9. It is also evident that while the casing operates as a protector for the pneumatic tire, it does not interfere with the operation thereof. It is also obvious that with the shoes 13 and plates 12 associated therewith bearing independently on the pneumatic tires, the resiliency of said tires is imparted to each of the said shoes.

When desired, the shoes 13 may be removed and new shoes be substituted therefor, by releasing the screws 15. When the screws 15 are withdrawn, the shoes 13 may be lifted from the cup-shaped recesses of the shoes 12. It is also obvious that if desired the shoes 13 may be replaced by rigid anti-skidding devices designed and constructed in conformity with the shoes 13.

It is obvious that when the weight of the vehicle is imposed on the tire and shoe 8 thereof, the plates 12 are pressed through the openings 11 in the casing 10 to indent the shoe 8, thereby causing the lateral expansion of the said shoe which the said casing is designed to permit. Also it will be observed that the relative inward projection of the plates 12 in the casing 10 form gripping members for the shoe 8, which avoids the slippage of the said shoe within the casing.

Claim.

The combination of a pneumatic tire; a rigid continuous annular metal casing for infolding the same, said casing being wider than said tire; a plurality of exposed traction shoes; a plurality of plates supporting said shoes, said plates engaging said casing in sliding relation thereto; and means for removably connecting said shoes and plates in service relation.

ARTHUR CARTHEUSER.